(12) United States Patent
Cudak et al.

(10) Patent No.: US 8,902,532 B2
(45) Date of Patent: Dec. 2, 2014

(54) WRITE AVOIDANCE AREAS AROUND BAD BLOCKS ON A HARD DISK DRIVE PLATTER

(71) Applicant: International Business Machines Corporation, Armonk, NY (US)

(72) Inventors: Gary D. Cudak, Creedmoor, NC (US); Lydia M. Do, Raleigh, NC (US); Christopher J. Hardee, Raleigh, NC (US); Adam Roberts, Moncure, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/847,658

(22) Filed: Mar. 20, 2013

(65) Prior Publication Data

US 2014/0285917 A1 Sep. 25, 2014

(51) Int. Cl.
*G11B 5/02* (2006.01)
*G11B 20/18* (2006.01)

(52) U.S. Cl.
CPC .................................. *G11B 20/1889* (2013.01)
USPC ............... 360/55; 360/53; 360/77.04; 360/31

(58) Field of Classification Search
None
See application file for complete search history.

(56) References Cited

U.S. PATENT DOCUMENTS

| | | |
|---|---|---|
| 4,237,501 A | 12/1980 | Barmache et al. |
| 5,075,804 A | 12/1991 | Deyring |
| 5,166,936 A | 11/1992 | Ewert et al. |
| 5,243,591 A | 9/1993 | Mogamiya |
| 5,287,363 A | 2/1994 | Wolf et al. |
| 5,793,559 A | 8/1998 | Shepherd et al. |
| 5,937,435 A | 8/1999 | Dobbek et al. |
| 6,101,062 A | 8/2000 | Jen et al. |
| 6,327,679 B1 | 12/2001 | Russell |
| 6,654,193 B1 | 11/2003 | Thelin |
| 7,050,252 B1 | 5/2006 | Vallis |
| 7,197,593 B2 | 3/2007 | Fukuhisa et al. |
| 7,447,938 B1 | 11/2008 | Coatney |
| 7,743,283 B1 | 6/2010 | Taylor et al. |
| 8,619,524 B2 * | 12/2013 | Akahoshi ................... 369/47.14 |
| 2001/0048567 A1 * | 12/2001 | Chng et al. ....................... 360/53 |
| 2002/0035704 A1 | 3/2002 | Wilson |
| 2003/0070109 A1 | 4/2003 | Harada |
| 2004/0093551 A1 | 5/2004 | Asano |
| 2005/0057842 A1 | 3/2005 | Khanna |
| 2005/0162947 A1 | 7/2005 | Kim et al. |
| 2006/0259812 A1 | 11/2006 | Chen et al. |
| 2007/0053093 A1 * | 3/2007 | Allen et al. ..................... 360/48 |

FOREIGN PATENT DOCUMENTS

GB 2343265 A 5/2000

OTHER PUBLICATIONS

Superuser—Stack Exchange "Are all bad blocks the same on a HDD?" hard drive—Are all bad blocks the same on a HDD?—Super User, Mar. 13, 2012, 4 pages.

Aplus Computer "Analysis of Hard Disk Bad Sector—Part 4/5" http://consultancomputeraplus.blogspot.com/view/classic?z, Jul. 3, 2012, 85 pages.

(Continued)

*Primary Examiner* — Muhammad N Edun
(74) *Attorney, Agent, or Firm* — Katherine S. Brown; Jeffrey L. Streets (57) ABSTRACT

A method and computer program product identify the location of a bad block on a disk platter of a hard disk drive, determine an avoidance area extending from the bad block, and prevent data from being written to the avoidance area.

19 Claims, 6 Drawing Sheets

(56) References Cited

OTHER PUBLICATIONS

Hitachi Ltd, "JP2000298937A Oct 24, 2000 Magnetic Disk Device", English Abstract, Oct. 24, 2000, 24 pages.
International Business Mach Corp, "JP2001195835A Jul. 19, 2001 Method for Allocating Alternate Sector, Method for Reading Out Data, Disk Drive Assembly and Device for Reading Out and Writing AV Data", English Abstract, Jul. 19, 2001, 27 pages.
Toshiba Corp, "JP2002150714A May 24, 2002 Alternate Processing Method", English Abstract, May 24, 2002, 31 pages.
IBM TDB, "Defective Sector Relocate in a Flexible Disk Recorder", www.IP.com, IPCOM000046280D, Jun. 1, 1983, 3 pages.
AnandTEch Forums, "Reusing HDs with bad sectors (I know, I know, this is not the usual", Reusing HDs with bad sectors (I know, I know, this is not the usual [Archive]—AnandTech Forums, http://forums.anandtech.com/archive/index.php/t-2194142.html, Sep. 25, 2011, 4 pages.

* cited by examiner

WRITE AVOIDANCE AREAS AROUND BAD BLOCKS ON A HARD DISK DRIVE PLATTER

BACKGROUND

1. Field of the Invention

The present invention relates to the storage of data on hard disk drives, and more specifically relates to methods of dealing with bad portions of the disk.

2. Background of the Related Art

Data storage is a fundamental function of any computer system. The various types of data storage devices each have their own role and may find a specialized role that takes advantage of their strengths while minimizing their weaknesses. For example, hard disk drives are good at storing large amounts of data and, because they are non-volatile, they can store data without continual application of electricity. However, hard disk drives are also much slower than RAM, flash or cache memory, so any given computer system is unlikely to rely solely on a hard disk drive.

Still, hard disk drives are used in most notebook computers, desktop computers, servers, redundant arrays of independent disks (RAID) systems, storage area networks, and datacenters. These hard disk drives are responsible for storing operating systems, applications, and files and data of all types. The reliable operation of the hard disk drives is imperative to the operation of the computer systems that use those hard disk drives.

A hard disk drive includes one or more rotating disc-shaped platters and magnetic heads arranged on a moving actuator arm to read and write data to the surfaces of the platters. Unfortunately, the surface of a platter may become scratched or develop a crack, thereby making one or more block or sector of the platter unusable. Such a damaged area of a platter may be referred to as "failed" or "bad", and the blocks that are associated with the damaged area may be referred to as "failed blocks" or "bad blocks." Data previously stored in a failed block is likely to be corrupted or unreadable, and data may no longer be reliably written to the failed block.

BRIEF SUMMARY

One embodiment of the present invention provides a computer program product including computer readable program code embodied on a computer readable storage medium. The computer program product comprises computer readable program code for identifying the location of a bad block on a disk platter of a hard disk drive, computer readable program code for determining an avoidance area extending from the bad block, and computer readable program code for preventing data from being written to the avoidance area.

Another embodiment of the present invention provides a method comprising identifying the location of a bad block on a disk platter of a hard disk drive, determining an avoidance area extending from the bad block, and preventing data from being written to the avoidance area.

DETAILED DESCRIPTION

One embodiment of the present invention provides a computer program product including computer readable program code embodied on a computer readable storage medium. The computer program product comprises computer readable program code for identifying the location of a bad block on a disk platter of a hard disk drive, computer readable program code for determining an avoidance area extending from the bad block, and computer readable program code for preventing data from being written to the avoidance area. The computer program product may optionally include additional computer readable program code to implement any one or more features or aspects of the methods described herein.

Another embodiment of the present invention provides a method comprising identifying the location of a bad block on a disk platter of a hard disk drive, determining an avoidance area extending from the bad block, and preventing data from being written to the avoidance area.

Embodiments of the present invention recognize that failing areas of a hard disk drive platter may indicate a likely expansion in certain areas. For example, the disk could have a manufacturing defect and/or damage resulting from use or mishandling of the hard disk drive. Accordingly, not only is it important to identify the location of the one or more bad blocks that have already failed, but to avoid use of those locations that are likely to become bad blocks. By anticipating additional failures, embodiments of the invention are capable of avoiding or reducing an amount of lost data. One or more features of an embodiment of the invention may be implemented in a hard disk drive controller or driver.

As used herein, the term "bad block" refers to any contiguous region of the platter that has been damaged, fails, or is otherwise no longer suitable for storage of data. Accordingly, in a platter having multiple bad blocks, each bad block will be separated from any other bad block by an area where data can still be stored. It should be recognized that the area separating two bad blocks becomes damaged and becomes identified as "bad", then it is possible for the original two bad blocks to merge into a single bad block that includes the area of the original two bad blocks as well as the currently identified area of damage there between.

Embodiments of the invention include determining an avoidance area extending from the bad block. Where the bad block is located along an edge of the platter, the avoidance area may extend inwardly from the bad block. Preferably an avoidance area will extend around all available sides of the bad block, but where the bad block is along the edge of the platter, the avoidance area is unable to encompass the bad block. Where the bad block is located away from an edge of the platter, the avoidance area will extend in one or more direction from the bad block. Preferably, the avoidance area will extend in all directions from the bad block, such that the avoidance area "encompasses" the bad block. However, there may be instances where either the nature of the damage to the bad block or the dynamics of the read/write head of the hard disk drive may be adequately addressed by an avoidance area that extends in one or more direction without encompassing the entirety of the bad block.

A further embodiment may include notifying a user that the capacity of the hard disk drive has been reduced by the amount of the avoidance area. Such notice may take the form of displaying a message to the user.

Yet another embodiment includes copying data stored in the avoidance area to a destination area other than the avoidance area. Since the avoidance area is intended to reflect an increased risk of bad blocks appearing in the area proximate to one or more known bad block, it is prudent to move data stored in the avoidance area before the data is lost. This anticipatory action can prevent later recovery efforts and improve data reliability. Furthermore, the destination area may be located on the same hard disk drive outside of the avoidance area, but may also be located on a different storage device.

As mentioned above, embodiments of the invention include preventing data from being written to the avoidance area. Optionally, the method will prevent data from being written to the avoidance area until the disk reaches a utilization threshold. In response to meeting or exceeding the utilization threshold, data may be written into the avoidance area. However, the user is preferably notified that the avoidance area is being used so that additional storage capacity can be installed. In a further option, the method may prevent data from being written to the avoidance area until the disk has an insufficient amount of available area to store data in a given write operation.

When a bad block has been identified, the location of the bad block may be identified by a physical memory address or a list or range of physical memory addresses. These physical memory addresses may, for example, be stored in memory accessible to the hard disk drive controller so that the controller will not direct any data to be written in the bad block. Similarly, the avoidance area may be identified by a list or range of physical memory addresses. It should be recognized that a physical memory address may take various forms, such as polar coordinates.

Embodiments of the invention may further include monitoring for additional bad blocks over time, whether such monitoring is continual or periodic. In response to identifying the location of an additional bad block on the hard disk drive, the method may expand the avoidance area to encompass the additional bad block. Furthermore, even if the additional bad block falls within an existing avoidance area, the avoidance area is preferably expanded further to retain or increase the degree of unused area around the known bad blocks.

In addition, embodiments of the invention may further include identifying a group of bad blocks, wherein each bad block within the group is within a threshold distance from at least one other bad block. Accordingly, bad blocks that are close together may be treated as a group. The group may be in the nature of a cluster of bad blocks, a serial string of bad blocks, or any other pattern that may occur. Accordingly, the avoidance area may extend from an area defined by the group of bad blocks. Grouping the proximate bad blocks prior to determining an avoidance area may simplify the determination of the avoidance area and reduce the amount of work necessary to prevent use of the avoidance area.

In one alternative, embodiments of the invention may identify a group of bad blocks within an area having greater than a threshold density of bad blocks, and then determine an avoidance area extending from the group of bad blocks. A "threshold density of bad blocks" refers to the number of failed blocks per unit area of the platter. In one embodiment, a map of the platter is formed based on the density of block failures, such that the area inside the "pattern of failure" has a failure density that is greater than the threshold of density, and the area outside the "pattern of failure" has a failure density that is less than the threshold density.

When there are additional bad blocks identified as part of a group of bad blocks, the method may further determine a growth rate of the area of the group of bad blocks. The avoidance area may then be expanded at a proportional rate or logarithmic rate relative to the growth rate of the area of the group of bad blocks. For example, the growth rate of the bad block area might be measured as the [(area of a current pattern of failure)−(area of a previous pattern of failure)]/(time period passing between measurement of the previous and current patterns). Accordingly, the avoidance area may be made to expand at some factor times the growth rate.

Figure 1:
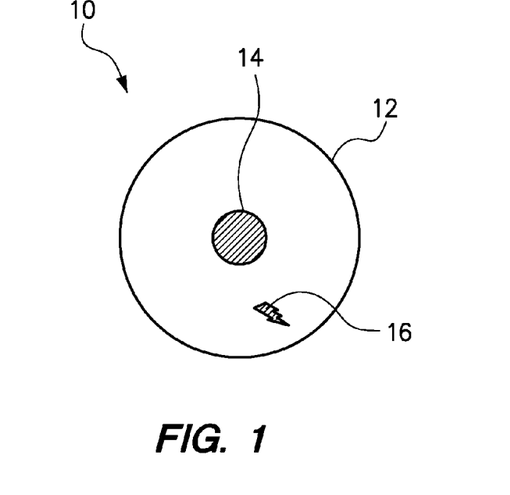
FIG. 1 is diagram of a hard disk drive platter having a bad block.

FIG. 1 is a diagram of a hard disk drive platter 10 having an outer circumferential edge 12 and a central region 14 for receiving a spindle that spins the platter 10. The platter 10 in FIG. 1 has a scratch 16 that forms at least one bad block.

Figure 2:
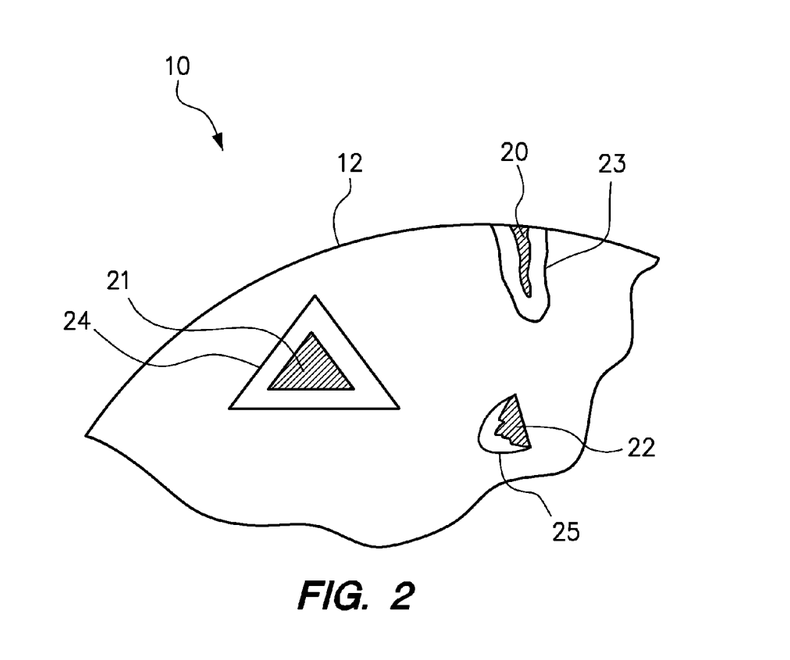
FIG. 2 is a diagram of one portion of a hypothetic platter having three bad blocks, each with their own avoidance area.

FIG. 2 is a diagram of one portion of a hypothetic platter 10 having three bad blocks 20, 21, 22, each with their own avoidance area 23, 24, 25, respectively. One bad block 20 is located along the outer circumferential edge 12 of the platter 10, and its avoidance area extends uniformly from all accessible sides of the bad block 20. A second bad block 21 has a triangular shape, as does the avoidance area 24 that encompasses the second bad black 21. A third bad block 22 has an irregular shape and an avoidance area 25 extending directionally from one side of the third bad block 22, presumably due to a conclusion that the nature of the third bad block 22 will tend to only grow in the direction of the avoidance area 25. In accordance with embodiments of the invention, a method may alter the disk write strategy to prevent writing data in the avoidance areas.

Figure 3:
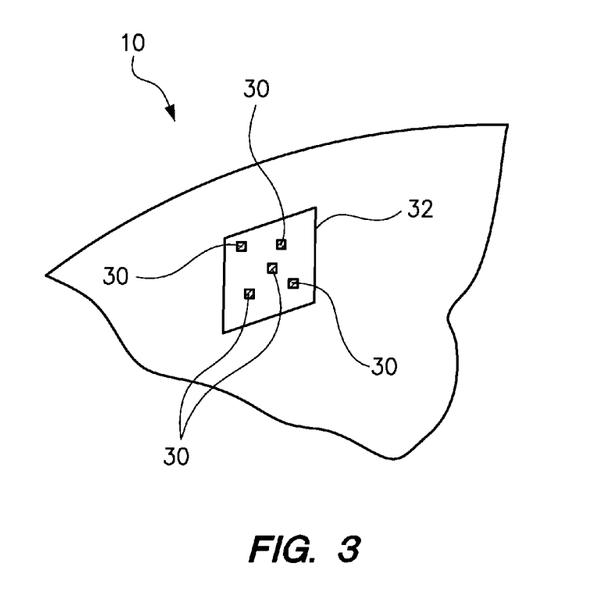
FIG. 3 is a diagram of a plurality of non-contiguous bad blocks encompassed by an avoidance area.

FIG. 3 is a diagram of a portion of a platter 10 having a group of bad blocks 30 encompassed by an avoidance area 32. Here, the avoidance area 32 has been determined in a manner that reflects the general pattern of the bad blocks 30. However, other avoidance area shapes would be suitable. The bad blocks are close enough to be handled as a group, and the "avoidance area" is some factor larger than the group. Data is prevented from being written into the avoidance area in anticipation of having further bad blocks in that area.

Figure 4:
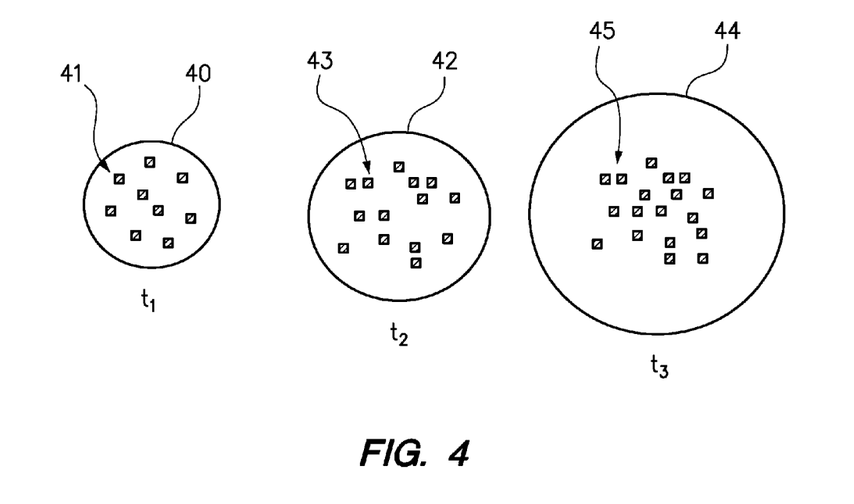
FIG. 4 is a diagram of a platter where the number of bad blocks is growing over time.

FIG. 4 is a diagram of a group of bad blocks that is growing over time. A first (left-most) avoidance area 40 encompasses the bad blocks 41 that have been identified at a first time, t1. A second (center) avoidance area 42 encompasses the bad blocks 43 that have been identified at a second (later) time, t2. A third (right-most) avoidance area 44 encompasses the bad blocks 45 that have been identified at a third time, t3. Accordingly, the diagram reflects that as time proceeds from t1 to t2 to t3, the number of bad blocks in the group increases from 9 to 14 to 18, respectively. The growth of the group may, in accordance with certain embodiments of the invention, result in a proportionally greater growth of the avoidance area, as reflect by the increased size of the avoidance areas (from left to right) and even the greater amount of avoidance area separating the bad blocks from the area outside the avoidance area.

Figure 5:
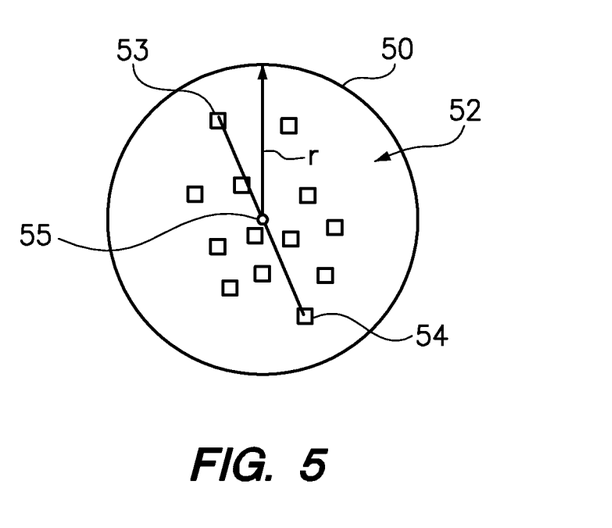
FIG. 5 is a diagram of a portion of a platter illustrating one method of determining an avoidance area for a group of bad blocks.

FIG. 5 is a diagram illustrating one method of determining an avoidance area 50 for a group of bad blocks 52. Here, the avoidance area 50 is determined to encompass the bad blocks 52 by identifying the two most distant bad blocks 53, 54 in the group, identify a center point 55 there between, then use that as the center of a circle having a radius (r) that is some percentage (here, about 30%) greater than half the distance between the two most distant points. Such a methodology may be programmed for execution by the memory controller.

Figure 6:
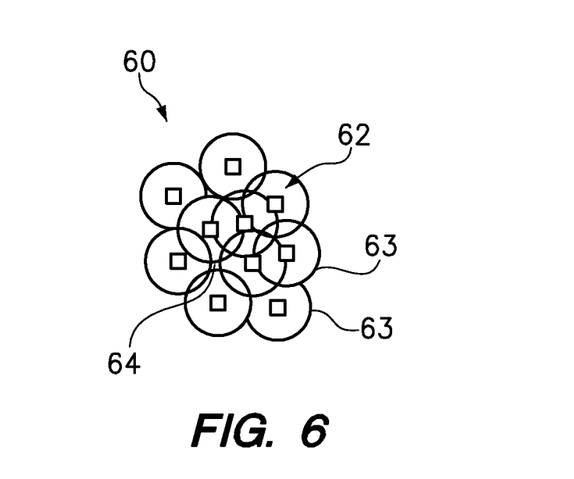
FIG. 6 is a diagram of a portion of a platter illustrating another method of determining an avoidance area for a group of bad blocks.

FIG. 6 is a diagram of another method of determining an avoidance area 60 for a group of bad blocks 62. In this method, every individual bad block 62 is treated the same as a bad block 62 that was not part of a group. An individual avoidance area 63 is determined in response to each bad block 62. However, this method is less preferred because it can result in small skipped areas 64 and the because the irregular boundaries of the avoidance area 60 may cause an increase in the amount of work that the hard disk drive controller must do to determine where data may or may not be stored.

Figure 7:
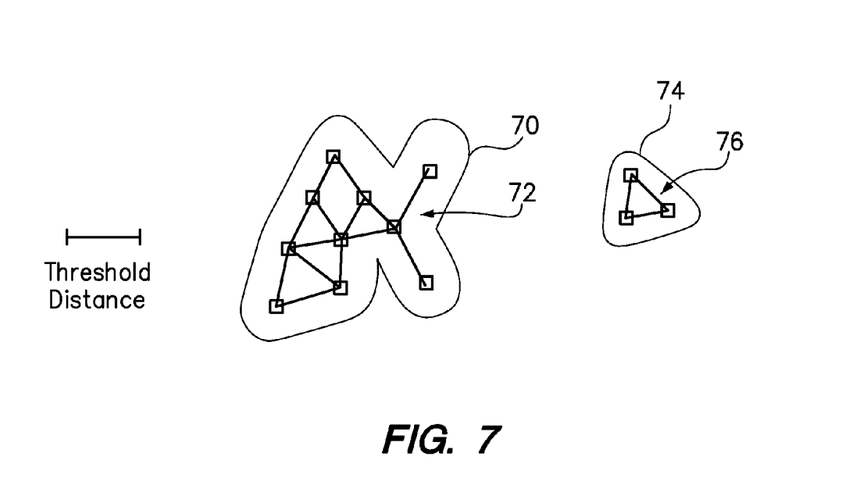
FIG. 7 is a diagram of a portion of a platter illustrating a further method of determining an avoidance area for a group of bad blocks.

FIG. 7 is a diagram of a further method of determining an avoidance area 70 for a group of bad blocks 72. In this method, a (conceptual) line is drawn between pairs of bad blocks, where one bad block is within a threshold distance from another bad block. No line is drawn between bad blocks that are separated by a distance greater than the threshold distance. Then, the locus of points that are equidistant from the lines and blocks form the boundary of the avoidance area 70. As shown, there are three bad blocks 76 that are with the threshold distance from each other, but none of those three bad blocks 76 are within the threshold distance from the bad blocks 72. Accordingly, the three bad blocks 76 form their own group defining a separate avoidance area 74.

Figure 8:
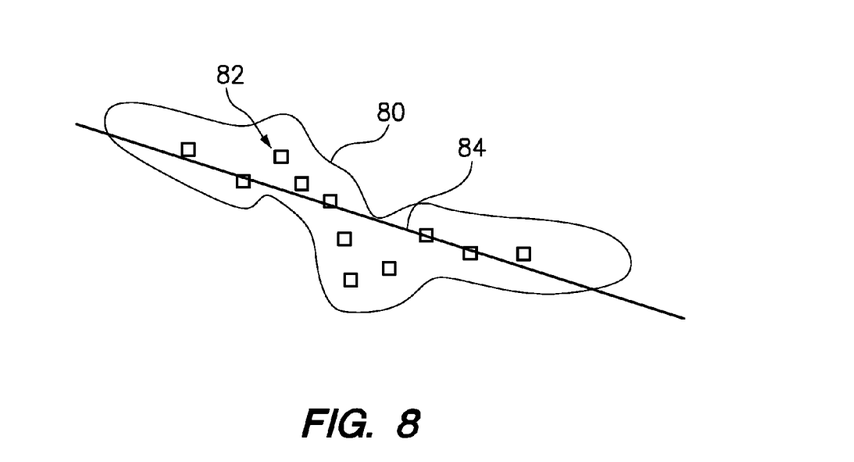
FIG. 8 is a diagram of a portion of a platter illustrating yet another method of determining an avoidance area having a number of bad blocks.

FIG. 8 is a diagram of yet another method of determining an avoidance area 80 having a number of bad blocks 82. As shown, the bad blocks 82 are somewhat linear, suggesting that the platter may have been scratched at some point during manufacture, shipping or use. A linear regression may be used to define a centerline 84 of the bad blocks 82 in the group. The avoidance area 80 may then extend outward from the group of bad blocks 82 in proportion to the group dimension along or away from the centerline. This method might be used to reflect the tendency of certain damages areas to propagate linearly.

Figure 9:
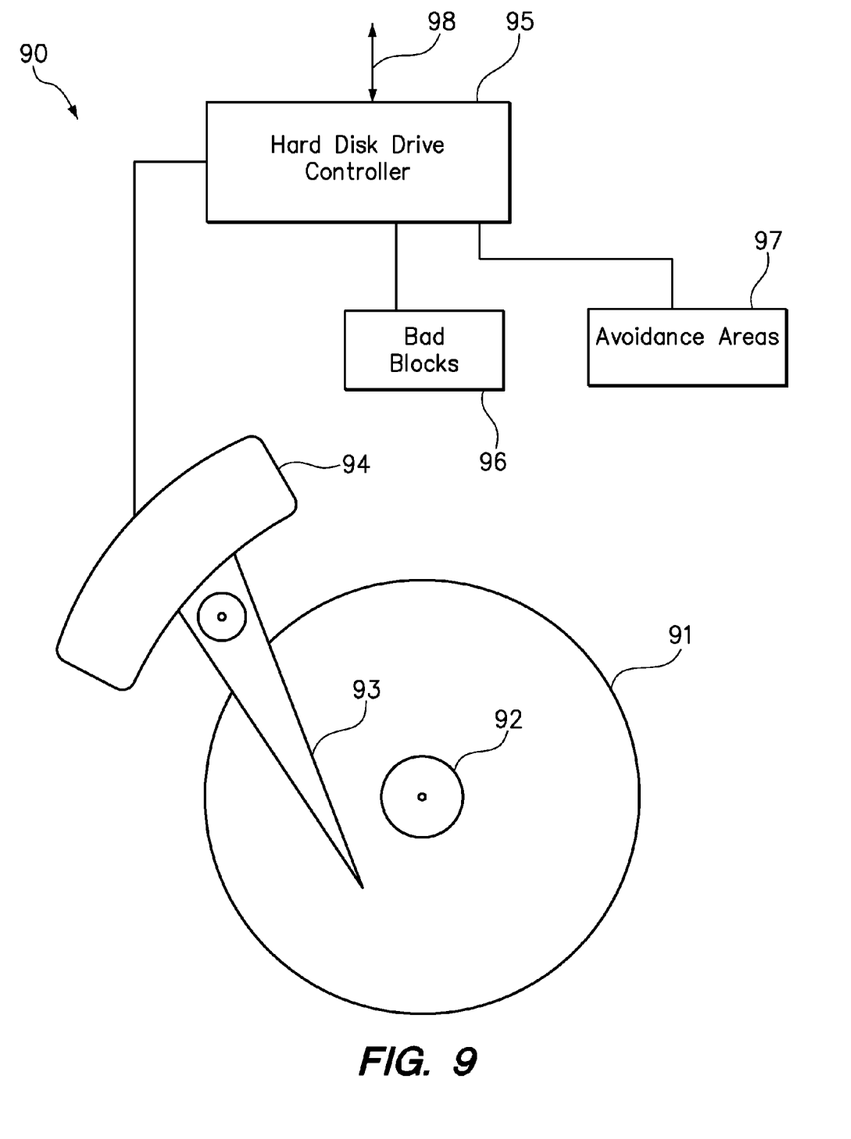
FIG. 9 is a diagram of a hard disk drive.

FIG. 9 is a diagram of a hard disk drive 90. A circular platter 91 spins about a spindle 92 and a read/write arm 93 is positioned over the platter 91 by an actuator 94. A hard disk drive controller 95 controls the actuator 94 to position the read/write arm 93 at particular physical addresses where data is to be written to the platter or read from the platter 91. When a bad block is identified, its physical address is stored in memory 96. When an avoidance area has been determined for a particular bad block or group of bad blocks, then the avoidance area is stored in memory 97. As the hard disk drive controller 95 receives instructions through its I/O port 98, the controller 95 consults the avoidance areas 97 to determine where data may be written. Similarly, the controller 95 may copy data from within an avoidance area to a new location that is outside the avoidance area.

Figure 10:
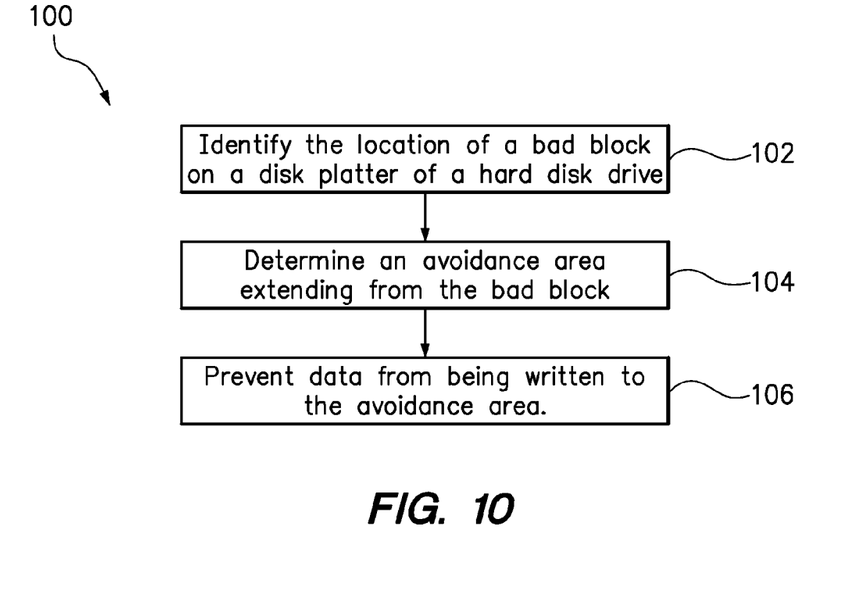
FIG. 10 is a flowchart of a method in accordance with one embodiment of the present invention.

FIG. 10 is a flowchart of a method 100 in accordance with one embodiment of the present invention. In step 102, the method identifies the location of a bad block on a disk platter of a hard disk drive. Step 104 determines an avoidance area extending from the bad block, and step 106 prevents data from being written to the avoidance area.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in one or more computer-readable storage medium having computer-usable program code stored thereon.

Any combination of one or more computer usable or computer readable storage medium(s) may be utilized. The computer-usable or computer-readable storage medium may be, for example but not limited to, an electronic, magnetic, electromagnetic, or semiconductor apparatus or device. More specific examples (a non-exhaustive list) of the computer-readable medium include: a portable computer diskette, a hard disk, random access memory (RAM), read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable storage medium may be any storage medium that can contain or store the program for use by a computer. Computer usable program code contained on the computer-usable storage medium may be communicated by a propagated data signal, either in baseband or as part of a carrier wave. The computer usable program code may be transmitted from one storage medium to another storage medium using any appropriate transmission medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable storage medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer program product including computer readable program code embodied on a non-transitory computer readable storage medium, the computer program product including:

computer readable program code for identifying the location of a bad block on a platter of a hard disk drive;

computer readable program code for determining an avoidance area extending from the bad block and encompassing the bad block; and computer readable program code for preventing data from being written to the avoidance area.

2. The computer program product of claim 1, further comprising:

computer readable program code for notifying a user that the capacity of the hard disk drive has been reduced by the amount of the avoidance area.

3. The computer program product of claim 1, further comprising:

computer readable program code for copying data stored in the avoidance area to a destination area other than the avoidance area.

4. The computer program product of claim 3, wherein the destination area is on the same hard disk drive outside of the avoidance area.

5. The computer program product of claim 1, further comprising:

computer readable program code for preventing data from being written to the avoidance area until the disk reaches a utilization threshold.

6. The computer program product of claim 1, further comprising:

computer readable program code for preventing data from being written to the avoidance area until the disk has an insufficient amount of available area to store data in a write instruction.

7. The computer program product of claim 1, wherein the location of the bad block is identified by a physical memory address.

8. The computer program product of claim 1, further comprising:

computer readable program code for identifying the location of an additional bad block on the hard disk drive; and computer readable program code for expanding the avoidance area to encompass the additional bad block.

9. The computer program product of claim 1, further comprising:

computer readable program code for identifying a group of bad blocks, wherein each bad block within the group is within a threshold distance from at least one other bad block; and wherein the computer readable program code for determining an avoidance area extending from the bad block includes computer readable program code for determining an avoidance area extending from the group of bad blocks.

10. The computer program product of claim 9, further comprising:

computer readable program code for determining a growth rate of the area of the group of bad blocks, wherein the avoidance area is expanded at a rate proportional to the growth rate of the area of the group of bad blocks.

11. The computer program product of claim 9, further comprising:

computer readable program code for determining a growth rate of the area of the group of bad blocks, wherein the avoidance area is expanded at a logarithmic rate relative to the growth rate of the area of the group of bad blocks.

12. The computer program product of claim 1, further comprising:

computer readable program code for identifying a group of bad blocks within an area having greater than a threshold density of bad blocks; and wherein the computer readable program code for determining an avoidance area extending from the bad block includes computer readable program code for determining an avoidance area extending from the group of bad blocks.

13. A computer-implemented method, comprising:

identifying the location of a bad block on a disk platter of a hard disk drive;

determining an avoidance area extending from the bad block and encompassing the bad block; and preventing data from being written to the avoidance area.

14. The method of claim 13, further comprising:

notifying a user that the capacity of the hard disk drive has been reduced by the amount of the avoidance area.

15. The method of claim 13, further comprising:

copying data stored in the avoidance area to a destination area other than the avoidance area.

16. The method of claim 13, further comprising:

preventing data from being written to the avoidance area until the disk reaches a utilization threshold.

17. The method of claim 13, further comprising:

identifying the location of an additional bad block on the hard disk drive; and expanding the avoidance area to encompass the additional bad block.

18. The method of claim 13, further comprising:

identifying a group of bad blocks, wherein each bad block within the group is within a threshold distance from at least one other bad block, wherein the avoidance area extends from the group of bad blocks.

19. The method of claim 13, further comprising:

identifying a group of bad blocks within an area having greater than a threshold density of bad blocks, wherein the avoidance area extends from the group of bad blocks.

* * * * *